Jan. 2, 1962 — A. K. THORNBURGH — 3,015,517
AIR CURRENT DEFLECTOR SHIELD
Filed May 25, 1959
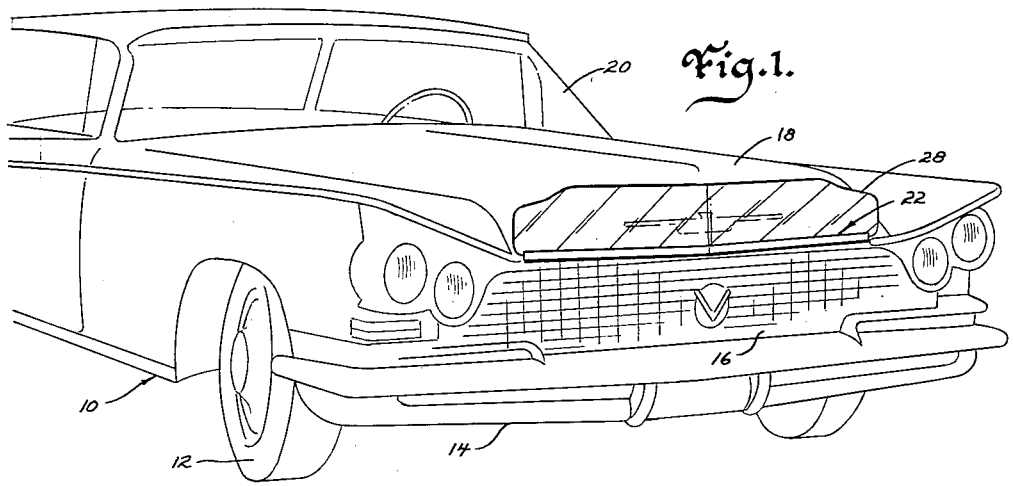
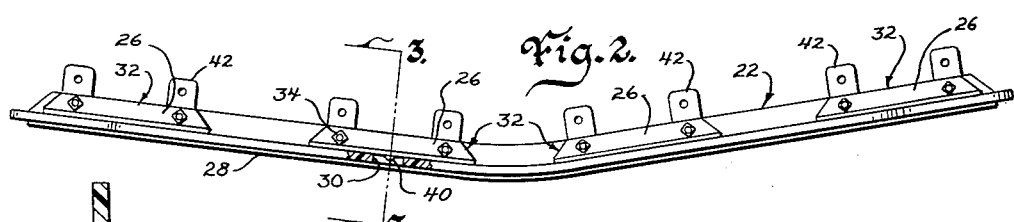
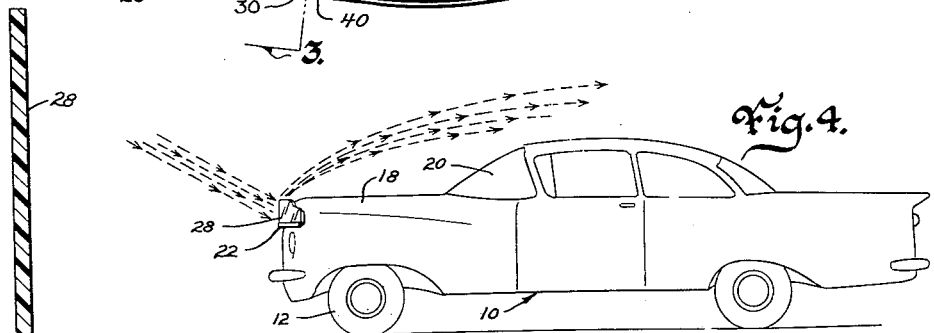
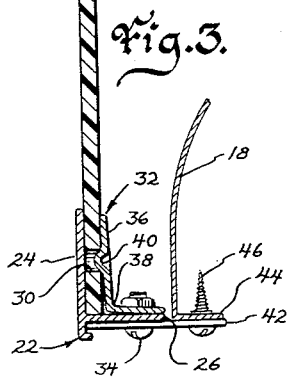
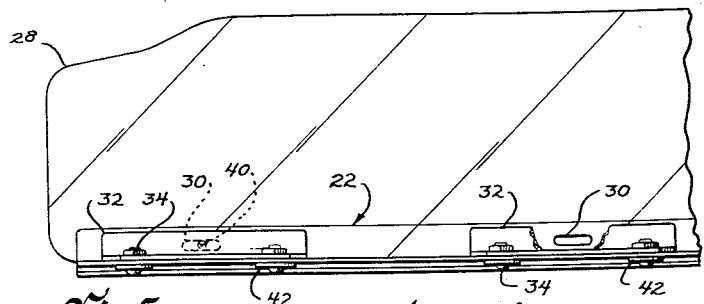
Inventor
Argyle K. Thornburgh
by Donald B. Zarley
Attorney
Witness
Edward P. Seeley

United States Patent Office 3,015,517
Patented Jan. 2, 1962

3,015,517
AIR CURRENT DEFLECTOR SHIELD
Argyle K. Thornburgh, Pleasantville, Iowa
Filed May 25, 1959, Ser. No. 815,487
3 Claims. (Cl. 296—91)

My invention relates to air current deflector shields and more particularly to air current deflector shields adapted for use with the modern vehicle. My invention is an improvement over the hood shield disclosed in my abandoned patent application Serial Number 440,940, filed July 2, 1954.

Some devices known to me have been placed on the hoods of automobiles to deflect the air currents passing thereover so that bugs and other insects would be carried by the deflected air currents over and above the vehicle rather than become splattered on the hood and windshield of the vehicle. However, these devices known to me have had to be placed in very conspicuous places on top of the hood in order to function properly. The addition of these structures to the top of the hood obviously detracts from the streamlined nature of the vehicle.

A further shortcoming of the shield devices known to me is that it is very difficult to make them strong enough to withstand the air pressures created by the high velocity of the vehicle and unsightly reinforcing structure must be placed on these shield devices to make them strong enough to withstand this pressure. Not only is this reinforcing structure unsightly but it provides additional surfaces for dust and other foreign matter to settle upon.

Therefore, the principal object of my invention is to provide an air current deflector shield for automobiles that can attain high strength characteristics without the use of substantial reinforcing elements.

A further object of my invention is to provide an air current deflector shield for automobiles that will protect the hood and windshield portions of the car from the adverse effects of insects, gravel and the like without being conspicuously visible and without detracting from the design features of the automobile.

A still further object of my invention is to provide an air current deflector shield for automobiles which becomes more rigidly secured to its mounting structure as higher velocities of the automobile are attained.

A still further object of my invention is to provide an air current deflector shield for automobiles that can be easily mounted in its supporting structure.

A still further object of my invention is to provide an air current deflector shield for automobiles which will not interfere with the operation or maintenance of the automobile.

A still further object of my invention is to provide an air current deflector shield which is economical of manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is a perspective view of my device on the front end of an automobile hood;

FIG. 2 is a top view of my device;

FIG. 3 is a sectional view of my device taken on line 3—3 of FIG. 2;

FIG. 4 is a side elevational view of my device mounted on the hood of an automobile with dotted lines showing the path of the deflected air currents; and FIG. 5 is a partial rear elevational view of my device.

I have used the numeral 10 to generally designate an automobile having wheels 12, bumper 14, grille 16, hood 18, and windshield 20. The front edge of hood 18 generally is curved to some degree but the exact curvature of the hood does not dictate the precise shape of my air current deflector shield.

The numeral 22 designates an L-shaped bracket which has a length that substantially corresponds to the frontal dimension of hood 18. Bracket 22 has a vertical leg 24 and a horizontal leg 26 and these legs should be approximately perpendicular to each other. As clearly shown in FIG. 2, bracket 22 is bent slightly rearwardly at its midpoint and should always have at least some curvature between its two extreme ends. This curvature should be present in bracket 22 whether the frontal edge of hood 18 is curved or not. A transparent shield 28 of Plexiglas or the like has its lower edge resting on the horizontal leg 26 of bracket 22 and shield 28 also engages the rearward surface of vertical leg 24 as shown in FIG. 3. Shield 28 extends upwardly from bracket 22 as clearly shown in FIGS. 1, 3 and 5. A plurality of horizontal elongated slots 30 is located adjacent the lower edge of shield 28 and I prefer that approximately four of these slots 30 be used. Clip angles 32 are mounted on the horizontal leg 26 of bracket 22 by means of nut and bolt assemblies 34. Clip angles 32 are comprised of vertical legs 36 and horizontal legs 38 and horizontal legs 38 rest directly on the horizontal leg 26 of bracket 22 as shown in FIG. 3. However, vertical leg 36 of clip angle 32 is in spaced apart relation with the vertical leg 24 of bracket 22 so as to permit shield 28 to fit therebetween. As shown in FIG. 3, an obtuse angle is formed between the vertical leg 36 and the horizontal leg 38 of clip angles 32 so that when nut and bolt assemblies 34 are tightened, the vertical leg 36 of the clip angles 32 will tend to hold shield 28 in binding engagement between the vertical legs of the clip angles and the bracket 22. The clip angles 32 are located adjacent the slots 30 in shield 28 and each of the clip angles is indented at 40 so that this indented portion penetrates into the slots of the shield. This indented portion 40 of the clip angles prevents upward movement of the shield 28 out of the grasp of the vertical leg portions of bracket 22 and the respective clip angles.

As shown in FIG. 2, each of the clip angles 32 has at least two nut and bolt assemblies 34. Each nut and bolt assembly 34 secures a rearwardly extending arm 42 to the bottom surface of the horizontal leg 26 on bracket 22. If the curvature in bracket 22 coincides to the curvature of the front edge of hood 18, all of arms 42 can be of the same length. However, since some curvature is essential in bracket 22 whether the hood is curved or not, arms 42 can be of different lengths if my device is to be attached to a hood which has a frontal edge that has no curvature or less curvature than the bracket 22. The rearward ends of arms 42 can be secured to the flange 44 on the frontal edge of hood 18 by means of metal screws 46. This arrangement is shown in FIG. 3 and represents only one possible means of securing arms 42 to a hood of an automobile.

The top of shield 28 should be in substantial alignment with the top of hood 18 and this relationship between the shield 28 and the hood 18 is shown in FIGS. 1 and 4.

The normal operation of my device is as follows: My device is secured to the frontal edge of hood 18 in the manner described and when so installed, assumes the position shown in FIGS. 1 and 4. The bracket 22 is then in substantial alignment with the lower frontal edge of the hood 18 and is therefore in substantial alignment with one of the permanent contours in the design of any automobile. The shield 28 is of one piece construction and is completely transparent so that it presents no structure that is conspicuously visible. Furthermore, the top of shield 28 terminates substantially at the level of the top of hood 18 to further disguise its presence. Since the shield 28 is made of one piece of material and since it has a curvature imposed therein by bracket 22, it assumes high strength characteristics and strongly resists being bent by wind pressure in a rearward direction. Thus, the section of shield 28 shown in FIG. 3 will never be bent toward the hood 18 by wind pressure because of the curvature imposed therein by bracket 22. Furthermore, when high wind velocities strike shield 28 from its forward side, this pressure tends to take the curvature out of the shield. Obviously, the tendency of shield 28 to straighten itself within the curved confines of bracket 22 and clip angles 32 only increases the binding tension of the bracket and the clip angles upon the shield. Thus, the greater the air pressure on one side of shield 28, the greater will be the binding force of clip angles 32 and bracket 22.

Because shield 28 presents a surface which is not streamlined to the contour of the upper frontal portion of hood 18, much air turbulence is created as the automobile attains high velocities. I have discovered that because of the size of my shield 28, air currents are deflected completely over the top of automobile 10 as the automobile is being driven at normal speeds. This result is accomplished even though my shield is located on the front of hood 18 and does not extend thereabove.

Since the curvature of my shield device greatly enhances its strength characteristics, no reinforcing structure is needed to give it additional strength. The absence of such reinforcing structure also reduces the number of surfaces where dirt can collect. It is also apparent that my shield device will protect the front of the hood 18 from gravel and insects as well as creating the deflection of air currents as described above.

From the foregoing, it is seen that my device will therefore accomplish all of its stated objectives.

Some changes may be made in the construction and arrangement of my air current deflector shield without departing from the real spirit and purpose of my invention, and it is my intention to cover by my claims, and modified forms of structure or use of mechanical equivalents which may be reasonably included within their scope.

I claim:
1. In an air current deflector shield, a shield member comprised of a single piece of transparent material, said shield member having its entire lower edge dwelling in a single flat plane, an elongated rigid bracket curved at its midpoint, and connecting means on said bracket to bind said shield in a curved position on said bracket in the curved shape defined by said bracket; said bracket engaging only the entire length of the lower edge of said shield member.

2. In an air current deflector shield, a shield member comprised of a single piece of transparent material, said shield member having its entire lower edge dwelling in a single flat plane, an elongated rigid bracket curved at its midpoint, and connecting means on said bracket to bind said shield in a curved position on said bracket in the curved shape defined by said bracket; said bracket engaging only the entire length of the lower edge of said shield member; said connecting means dwelling in a plane below the highest point on said bracket.

3. In an air current deflector shield, a shield member comprised of a single piece of transparent material, said shield member having its entire lower edge dwelling in a single flat plane, an elongate rigid bracket curved at its midpoint, said bracket having a uniform L-shaped cross section; and connecting means on said bracket to bind said shield in a curved position on said bracket in the curved shape defined by said bracket; said bracket engaging only the entire length of the lower edge of said shield member; said connecting means dwelling in a plane below the highest point on said bracket.

References Cited in the file of this patent

UNITED STATES PATENTS

| | | |
|---|---|---|
| 1,478,279 | Henne | Dec. 18, 1923 |
| 1,504,767 | Hodny | Aug. 12, 1924 |
| 1,777,569 | Lillie | Oct. 7, 1930 |
| 2,206,956 | Hoag | July 9, 1940 |
| 2,229,516 | Metzger | Jan. 21, 1941 |
| 2,236,846 | Davisson | Apr. 1, 1941 |
| 2,338,199 | Parke | Jan. 4, 1944 |
| 2,638,376 | Berry | May 12, 1953 |
| 2,778,439 | Pfingsten | Jan. 22, 1957 |
| 2,868,308 | Biewald | Jan. 13, 1959 |
| 2,872,242 | Whartman et al. | Feb. 3, 1959 |

FOREIGN PATENTS

| | | |
|---|---|---|
| 733,986 | Great Britain | July 20, 1955 |
| 734,735 | Great Britain | Aug. 3, 1955 |